United States Patent
Dolansky

(10) Patent No.: US 7,302,302 B2
(45) Date of Patent: Nov. 27, 2007

(54) METHOD FOR CONTROLLING A PRODUCTION MACHINE, IN PARTICULAR A MACHINE TOOL, WITH THE CONTROLLER ASSOCIATED WITH A PRODUCTION MACHINE

(75) Inventor: Stefan Dolansky, Altdorf (DE)

(73) Assignee: Siemens Aktiengesellschaft, München (DE)

(*) Notice: Subject to any disclaimer, the term of this patent is extended or adjusted under 35 U.S.C. 154(b) by 264 days.

(21) Appl. No.: 10/965,668

(22) Filed: Oct. 14, 2004

(65) Prior Publication Data
US 2005/0090910 A1    Apr. 28, 2005

(30) Foreign Application Priority Data
Oct. 15, 2003    (DE) .................... 103 47 972

(51) Int. Cl.
  G05B 11/01    (2006.01)
  G06F 15/167    (2006.01)
(52) U.S. Cl. .......................... 700/19; 709/213
(58) Field of Classification Search .............. 700/19, 700/24, 5, 79, 20; 709/213, 214, 245
See application file for complete search history.

(56) References Cited

U.S. PATENT DOCUMENTS

| | | | | |
|---|---|---|---|---|
| 3,989,003 | A | * | 11/1976 | Fagan et al. ............... 118/676 |
| RE29,642 | E | * | 5/1978 | Kwiatkowski et al. ........ 700/19 |
| 4,488,241 | A | | 12/1984 | Hutchins et al. |
| 4,754,427 | A | * | 6/1988 | Okayama ..................... 700/3 |
| 5,086,385 | A | * | 2/1992 | Launey et al. ............... 700/83 |
| 5,621,662 | A | * | 4/1997 | Humphries et al. ......... 700/276 |
| 5,843,515 | A | * | 12/1998 | Crum et al. .................. 427/8 |
| 5,845,149 | A | * | 12/1998 | Husted et al. ................ 710/9 |
| 6,389,331 | B1 | * | 5/2002 | Jensen et al. .............. 700/275 |
| 6,547,884 | B1 | | 4/2003 | Crum et al. |
| 6,845,301 | B2 | * | 1/2005 | Hamamatsu et al. ........ 700/292 |
| 2002/0111698 | A1 | * | 8/2002 | Graziano et al. ............. 700/17 |

FOREIGN PATENT DOCUMENTS

| | | |
|---|---|---|
| DE | 695 10 864 T2 | 11/1999 |
| DE | 100 11 661 A1 | 9/2000 |
| DE | 100 29 133 A1 | 1/2002 |
| DE | 101 06 397 A1 | 9/2002 |
| EP | 0 927 600 A | 7/1999 |
| WO | WO 01/82009 A2 | 11/2001 |

* cited by examiner

*Primary Examiner*—Thomas K. Pham
(74) *Attorney, Agent, or Firm*—Henry M. Feiereisen; Ursula B. Day

(57) ABSTRACT

A production machine has a controller and a plurality of components that include link addresses associated with a memory region of a separate computer that can be connected with the controller via a computer-to-computer link. Parameter data for the components are stored in the memory region. The link addresses are stored either in the components themselves or in component associated with these components. The controller accesses the link addresses and then uses the link addresses to access parameter data. The controller executes a control program to determine control commands for components, such as actuators, of the production machine, with the control commands depending on the parameter data, and transmits the control commands to the production machine.

12 Claims, 3 Drawing Sheets

METHOD FOR CONTROLLING A PRODUCTION MACHINE, IN PARTICULAR A MACHINE TOOL, WITH THE CONTROLLER ASSOCIATED WITH A PRODUCTION MACHINE

CROSS-REFERENCES TO RELATED APPLICATIONS

This application claims the priority of German Patent Application, Serial No. 103 47 972.4, filed Oct. 15, 2003, pursuant to 35 U.S.C. 119(a)-(d), the disclosure of which is incorporated herein by reference.

BACKGROUND OF THE INVENTION

The present invention relates to a method for controlling a production machine, in particular a machine tool, with a controller associated with a production machine. The present invention is also directed to a data carrier with a computer program for carrying out the method and a controller for a production machine, in particular a machine tool, with a program memory storing a computer program that can be executed by the controller to perform the method. The present invention is further directed to a production machine, in particular a machine tool, with an associated controller and a plurality of components, wherein the controller is configured to execute the method.

Nothing in the following discussion of the state of the art is to be construed as an admission of prior art.

Controllers implemented either as numerical controllers (CNC) or as stored-program controllers (SPC) are frequently used to control production machines. The controllers execute a control program that includes instructions, such as a parts program for a machine tool that conforms to DIN (German Industrial Standard) 66025 or DIN 66025+.

The controller converts the instructions into control commands that depend on a variety of machine parameters. One exemplary machine parameter is a drive mechanism. To properly determine the control commands, the machine parameters are conveyed to the controller in the form of corresponding parameter data. Examples of such parameter data are, for example, a motor characteristic or other data measured on the motor, or a pitch characteristic of a spindle.

Conventionally, the parameter data are entered into the controller via a programming device. However, this approach has disadvantages because the parameter data may not accurately represent the actual machine parameters.

It may be feasible to store parameter data for each component, either in the component itself or in a component associated with that component, that describe the machine parameters of the corresponding component. The parameter would then be able to accurately describe the actual machine parameters. However, depending on the quantity of the parameter data, sizable memory regions may be required in the respective components so that all the parameter data can be stored.

It would therefore be desirable and advantageous to provide an improved method for controlling a production machine, which obviates prior art shortcomings and is able to accurately describe the actual machine parameters with parameter data, without the need to transfer large amounts of data between the various components and the controller.

SUMMARY OF THE INVENTION

According to one aspect of the present invention, a method for controlling a production machine with a plurality of components includes the steps of providing a controller for the production machine, wherein the controller is controlled by a control program, and providing a computer separate from the controller, wherein the computer includes a memory region and can at least temporarily be connected with the controller by a computer-to-computer link. The method further includes the steps of associating with each of the components a corresponding link address to the memory region of the computer, storing the corresponding link address of a component in the component itself or in another component associated with the component, and storing parameter data for at least one of the components in the memory region. The controller accesses the link addresses and the parameter data via the link addresses, determines based on the control program control commands for the components of the production machine, whereby the control commands depend on the parameter data, and transmits the control commands to the production machine.

With this approach, the parameter data can be automatically recalled when the production machine is started up, thereby enabling plug & play functionality. Each component requires only a small memory space of, for example, 128 or 256 Bytes, while enabling access to a practically unlimited quantity of data via the link address. The parameter data can be stored and/or changed in the memory region of the computer at any time, in particular after the corresponding components are delivered.

The components can be of any suitable type. For example, at least one of the components can be an electrical component, such as an input/output unit, a motor, a power supply, such as a converter, a sensor and/or actuator. Alternatively or in addition, at least one of the components can be a mechanical component. The components can also be a combination of electrical and mechanical components, for example a gear.

According to an advantageous embodiment of the invention, the control method can make efficient use of the computer memory if the link address includes a type address that can recall from the computer configuration-specific parameter data of the corresponding component, and an individual address that can recall component-specific, user-specific and/or application-specific parameter data. Examples of component-specific parameter data are a type designation, typical characteristic curves as well as associated tolerances and applications. Examples of component-specific, user-specific and/or application-specific parameter data are the manufacturing date, the end user, the installation site, and characteristic curves of this component.

According to another advantageous embodiment of the invention, at least one of the components can be a sensor which the controller can use to measure a component state of at least one of the components. The controller can transmit at least from time to time the measured component state or information derived from the measured component state to the computer by using a link address associated with this component. The component state can thereby be more easily centrally evaluated. For example, the computer can centrally identify in time any scheduled maintenance. In addition, any design errors can be readily identified by comparing the transmitted component states and/or information about several components of the same type.

The computer-to-computer link can be implemented in any suitable manner, for example as LAN or Internet connection.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
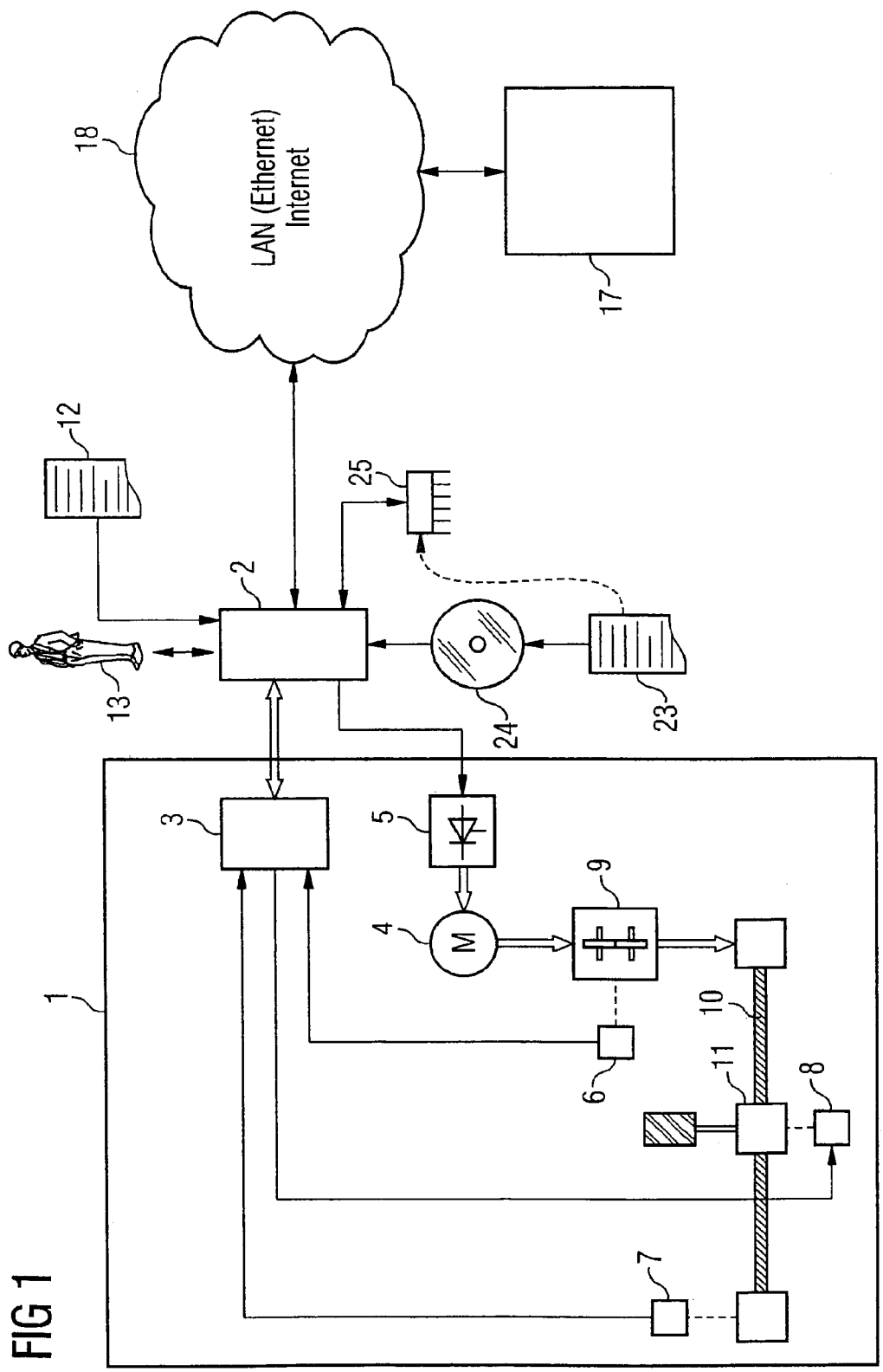
FIG. 1 shows schematically a production machine or machine tool connected with a controller and an external computer.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a controller 2 associated with a machine tool 1, for example a production machine 1. The exemplary controller 2 can be, for example, a numerical controller 2. Alternatively, the controller 2 of the production machine 1 can also be a stored-memory controller.

The machine tool 1 can also include a number of components 3 to 11, for example, an input/output unit 3, a motor 4, a power supply 5, depicted here as an exemplary converter 5, two sensors 6, 7, an actuator 8, a gear 9, a spindle 10, and a tool holder 11. The machine tool 1 can include both electrical components, such as the components 3 to 8, and mechanical components, such as the components 9 to 11.

The position of the spindle 10 and thereby also the position of the tool holder 11 can be adjusted with the motor 4 via the gear 9. The motor 4 derives electric power from the converter 5. The sensors 6 and 7 can measure, for example, the temperature of the gear 9 and the position of the spindle 10. The tool holder 11 can be operated, for example, by actuator 8.

The signals measured by the sensors 6, 7 are transmitted to the controller 2 via the input/output unit 3. Likewise, the input/output unit 3 can also transmit to the actuator 8 the control commands determined by the controller 2.

The controller 2 can also determine with the help of a control program 12, which can be defined in the controller 2 by a user 13, control commands for the actuator 8, the motor 4 as well as for other actuators (not shown in FIG. 1). The control program 12 includes a number of instructions, for example a parts program according to DIN 66025 or DIN 66025+. The controller 2 executes a control process to determine the control commands to be transmitted to the various actuators 4, 8. The control process will be described in detail hereinafter with reference to FIGS. 2 and 3.

Figure 2:
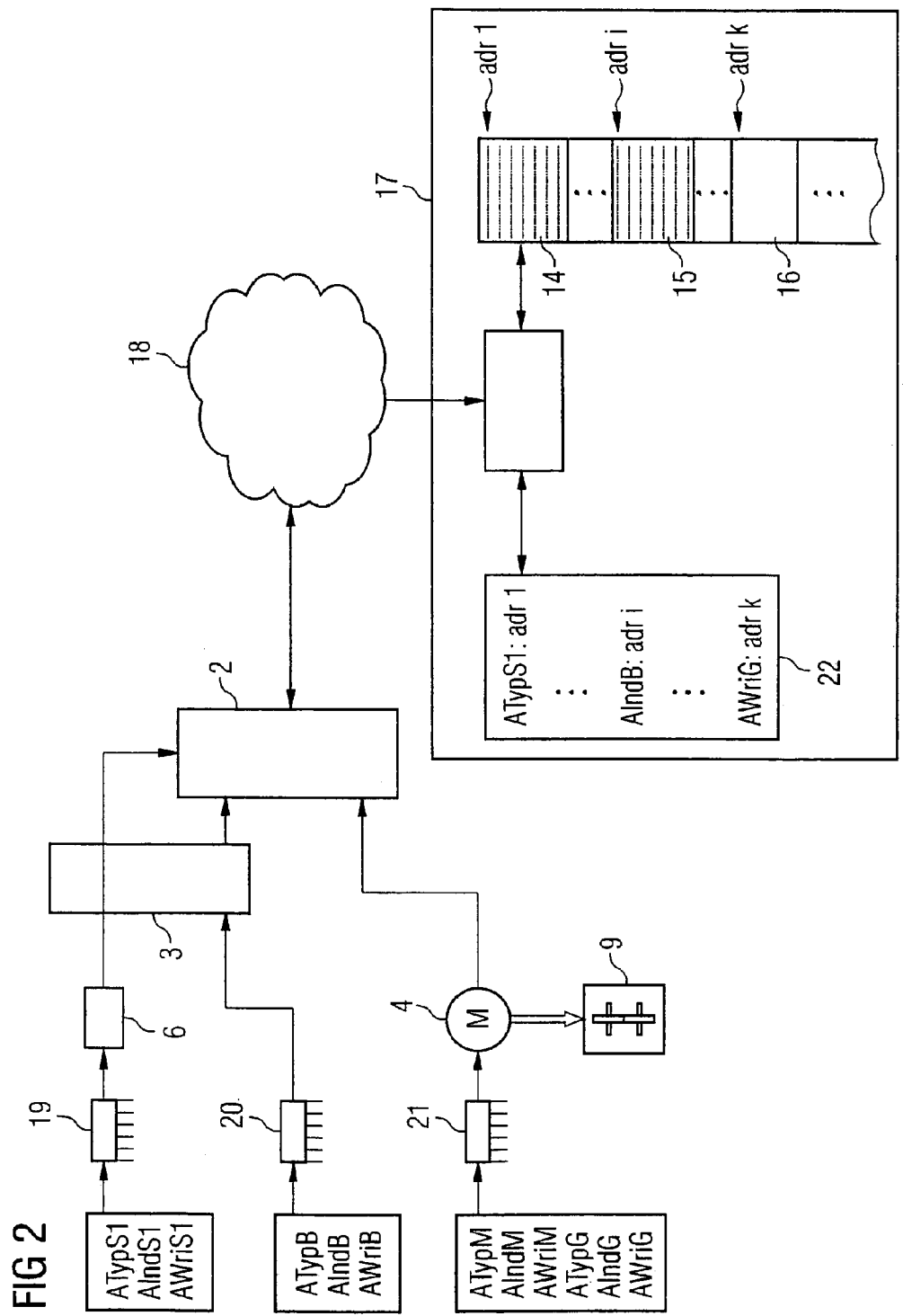
FIG. 2 shows an addressing scheme used by the controller.

As shown in FIG. 2 in an exemplary embodiment, a link address is associated with certain components 3 to 11, such as the sensor 6, the input/output unit 3, the motor 4, and the gear 9. Each link address includes three partial addresses, namely a type address ATypS1, ATypB, ATypM, ATypG, an individual address AIndS1, AIndB, AIndM, AIndG, and a write address AWriS1, AWriB, AWriM, AWriG.

Each of these addresses can be used to access one of the memory regions 14 to 16 associated with the respective address. The computer 17 is hereby a device 17 that is a separate from the controller 2. The computer 17 can be at least temporarily connected with the controller 2 via a computer-to-computer link 18. The computer-to computer link 18 can in principle be implemented in any suitable form. It may be possible to implement the computer-to computer link 18 as a point-to-point connection. However, the computer-to computer link 18 is typically implemented as a computer network, such as a local area network (LAN) or the Internet.

The addresses are stored in address memories 19 to 21, which are disposed either in the component 3, 4, 6 themselves or in a component 4 associated with the component 9, depending on the type of the components 3, 4, 6, 9. The address memories 19 to 21 are connected with the controller 2 for data transfer when the machine tool 1 is installed.

Figure 3:
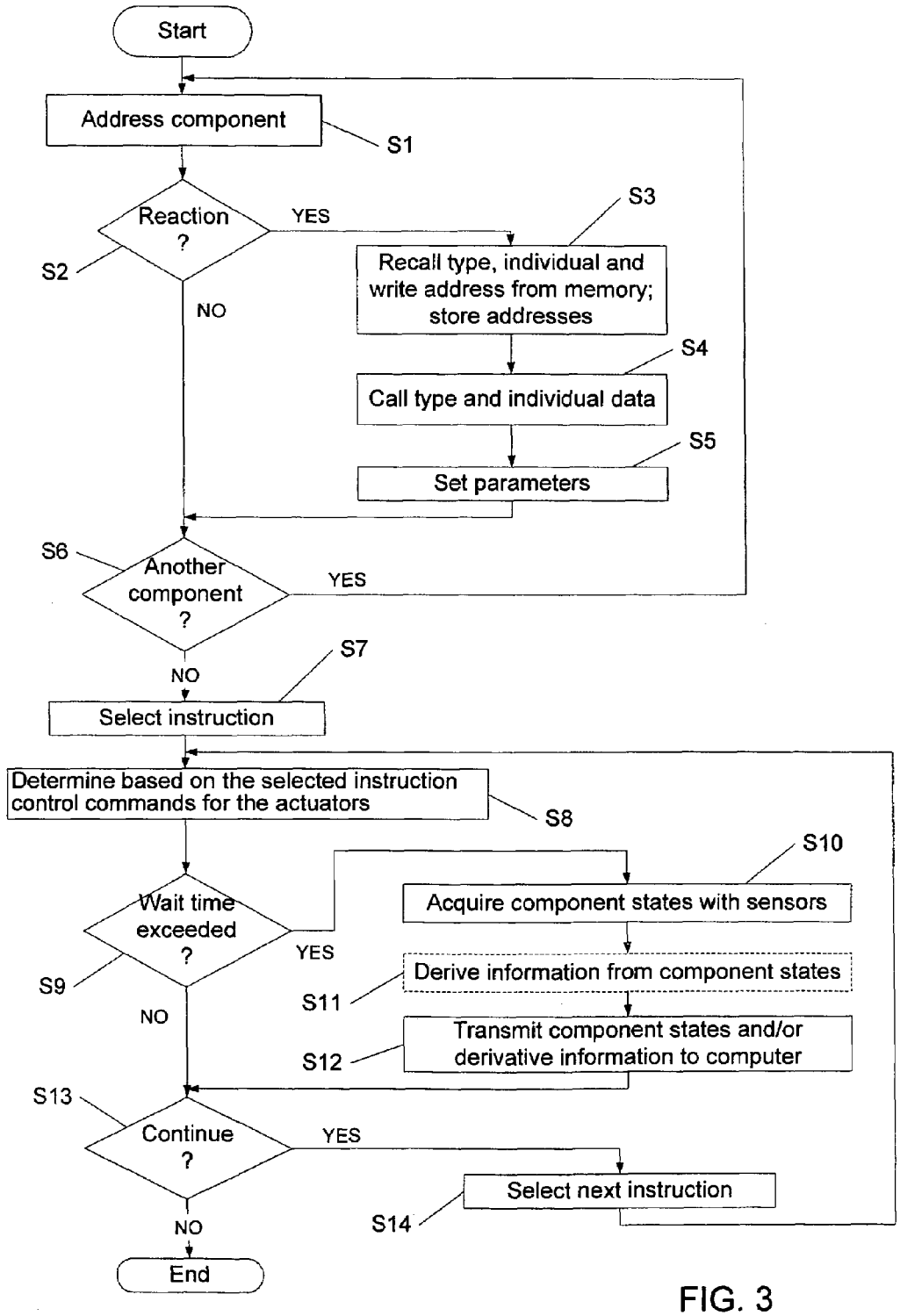
FIG. 3 shows a process flow diagram for controlling the production machine or machine tool of FIG. 1 with the controller using the addressing scheme of FIG. 2.

As illustrated in FIG. 3, the controller 2 can initially address one of the components 3 to 11, for example the component 4, step S1. In step S2, the controller 2 awaits a response from the component 4. If a response is detected, then steps S3 to S5 are executed next; otherwise, the process goes directly to step S6.

In step S3, the controller 2 recalls the type address, the individual address, and the write address of the addressed component 4 and stores the addresses in a memory region (not shown) of the controller 2. In other words, the controller 2 initially accesses the link addresses of the address component 4. The controller 2 then uses the type address ATypM to access the associated memory regions 14 to 16 of the computer 17, step S4, and recalls the parameter data stored in these memory regions for the respective component. The controller 2 repeats the same steps for the individual address AIndM, which enables the controller 2 to access the type-specific parameter data of the respective component 4. The individual address AIndM enables component-specific, user-specific, and application-specific parameter data to be recalled from the computer 17. The transmitted link address is associated with the corresponding memory regions 14 to 16 within the computer 17 by a look-up table 22.

In step S5, the parameters in the controller 2 are set according to the recalled parameter data of the corresponding component 4, thereby realizing a plug & play functionality.

In step S6, the controller 2 checks if an additional component, such as the component 6, should be addressed. If this is not the case, then the process returns to step S1. Otherwise, step S7 is executed which starts execution of the control program 12.

In step S7, the controller 2 selects an instruction of the control program 12. In step S8, the controller 2 determines, based on the selected instruction, control commands for the actuators 4, 8, etc., of the machine tool 1 and transmits the control commands to the machine tool 1. The control commands are determined in step S8 depending on the parameters defined in the controller 2 and hence also on the parameter data of the components 3 to 11.

In step S9, the controller 2 checks if a predetermined wait time has been exceeded. The wait time can have arbitrary values, depending on the machine tool 1 and on the components 3 to 11. When the wait time has been exceeded, the controller 2 executes steps S10 to S12, otherwise the process goes directly to step S13. Step S11 is optional and is therefore indicated in FIG. 3 by a dotted line.

In step S10, the controller 2 measures via sensors 6, 7 states of the associated components 9, 10. For example, sensor 6 can be used to measure the temperature of the gear 9. In step S11, corresponding information can optionally be derived based on the measured component states. Derived information can be, for example, an excess temperature signal, if the measured temperature exceeds a preset limit value.

In step S12, the controller 2 transmits the measured component state (in the present example the temperature of the gear 9) and/or information derived therefrom (in the present example an excess temperature signal) to the write address of the respective component, in the present example the write address AWriG. The controller 2 then transmits this information to the computer 17. The computer 17 stores the transmitted data in a corresponding memory region 14 to 16, in the present example the memory region 16. The computer 17 determines the memory region 16 based on the provided write address, in the present example AWriG, and the look-up table 22.

In step S13, the controller checks if the control process should continue. For example, a user 13 may have entered a stop instruction or an emergency stop. Depending on the result of the check, the controller 2 terminates execution of the control method or goes to step S14. In step S14, the controller 2 selects the next instruction of the control program 12 to be executed, whereafter the process returns to step S8.

The control method of FIG. 1 can be implemented as a computer program 23. The computer program 23 can be provided to the controller 2, for example, in form of a data carrier 24, on which the computer program is stored in (exclusively) machine-readable form. Exemplary data carriers 24 are a diskette or a CD-ROM, and the like. Alternatively, the program can also be downloaded from another computer, for example from the computer 17.

When the computer program 23 is supplied to the controller 2, the computer program 23 is read from the data carrier 24 and transferred to a program memory 25 of the controller 2, where it is stored persistently, i.e., the computer program 23 remains in memory even when power is switched off. When the power is turned on again, the computer program 23 is immediately available for be execution.

In summary, the control method of the invention provides a simple approach for correctly setting the parameters of the controller 2.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method for controlling a production machine having plurality of components, the method comprising the steps of:
   storing in or in association with each of the components a corresponding link address linked to a memory region of a computer, with the memory region storing parameter data for the components;
   transmitting, upon connection of a component, from the component the link address to the controller disposed between the component and the computer;
   accessing with the controller the corresponding memory region of the computer corresponding to the link address; and
   obtaining with the controller the parameter data for the component based on the link address;
   determining with a control program resident on the controller from the parameter data control commands for the corresponding component; and
   transmitting the control commands to the corresponding component of the production machine.

2. The method of claim 1, wherein at least one of the components is an electrical component.

3. The method of claim 2, wherein the electrical component comprises a component selected from the group consisting of input unit, output unit, motor, power supply, converter, sensor and actuator.

4. The method of claim 1, wherein at least one of the components is a mechanical component.

5. The method of claim 4, wherein the mechanical component comprises a gear.

6. The method of claim 1, wherein the link address comprises a type address adapted for recalling from the computer configuration-specific parameter data of the corresponding component, and an individual address adapted for recalling from the computer component-specific, user-specific or application-specific parameter data, or a combination thereof.

7. The method of claim 1, wherein at least one of the components is a sensor and wherein the controller measures with the at least one sensor a component state of at least one of the components and transmits at least occasionally the measured component state or information derived from the measured component state to the computer via a link address associated with this component.

8. The method of claim 1 wherein the computer-computer link is implemented as a LAN or an Internet link.

9. The method of claim 1, wherein the production machine is a machine tool.

10. A control system for a production machine having plurality of components, said control system comprising
   a computer with a memory region storing parameter data for at least one of the components, wherein each of the components includes a corresponding link address to the memory region of the computer, said link address being stored in or in association with a component and further comprising
   a controller disposed intermediate between a component and the computer, said controller receiving a corresponding link address from a component, obtaining from the memory region of the computer the parameter data based on the link address, determining from the parameter data control commands for the component, and
   transmitting the control commands to the component of the production machine.

11. A production machine comprising
a controller and a plurality of components,
a computer with a memory region storing parameter data for at least one of the components, wherein each of the components includes an address memory having stored therein a corresponding link address to the memory region of the computer, said address memory being located in or in association with a component, with the controller disposed intermediate between a component and the computer, with the controller receiving a corresponding link address from a component,
obtaining from the meows region of the computer the parameter data based on the link address, determining from the parameter data control commands for the component, and
transmitting the control commands to the corresponding component of the production machine.

12. A control program stored on a computer-readable storage medium and enabling a controller of a production machine having a plurality of components to cause the production machine to perform the following steps when executed on the controller:
  storing in or in association with each of the components a corresponding link address to a memory region of a computer, with the memory region storing parameter data for the components;
  transmitting, upon connection of a component, from the component the link address to a controller disposed between the component and the computer;
  accessing with the controller the corresponding memory region of the computer corresponding to the link address;
  obtaining with the controller the parameter data for the component based on the link address;
  determining with the control program resident on the controller from the parameter data control commands for the corresponding component; and
  transmitting the control commands to the corresponding component of the production machine.

* * * * *